United States Patent Office 3,531,616
Patented Sept. 29, 1970

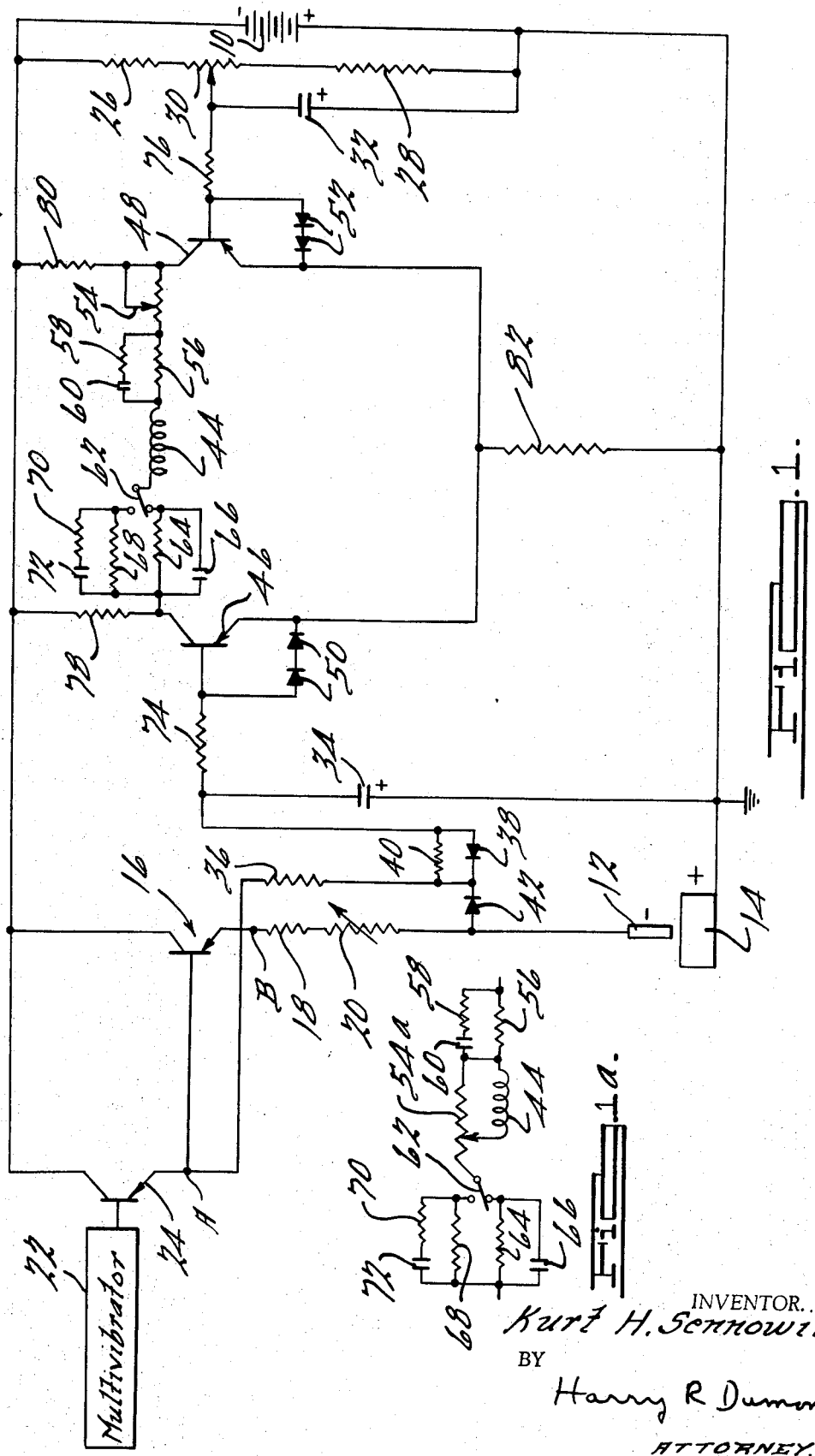

3,531,616
SERVOCONTROL CIRCUIT FOR ELECTRICAL DISCHARGE MACHINING APPARATUS
Kurt H. Sennowitz, Royal Oak, Mich., assignor to Elox Inc., Troy, Mich., a corporation of Delaware
Filed Jan. 22, 1968, Ser. No. 705,258
Int. Cl. B23p 1/14
U.S. Cl. 219—69         6 Claims

ABSTRACT OF THE DISCLOSURE

A circuit for maintaining relatively constant gap spacing between an electrical discharge machining electrode and workpiece wherein a control signal for a motive means is derived from a sensing network connected between a drive signal source and the gap. The drive signal source may be multivibrator whose output pulses trigger an electronic switch that supplies machining pulses to the erosion gap.

BACKGROUND OF THE INVENTION

The field to which my invention relates is that known as electrical discharge machining, hereinafter sometimes referred to as EDM, in which material is removed from an electrically conductive workpiece by the action of electrical gap discharges between a tool electrode and the workpiece. An electrode or workpiece servo feed system is employed to maintain an optimum gap spacing between electrode and workpiece as metal removal progresses. A dielectric coolant such as kerosene, or transformer oil is circulated continuously through the gap during machining operation. A major problem is that of providing a servo control circuit which is capable of providing a relatively constant gap and overcut as the material is being removed from the workpiece.

SUMMARY OF THE INVENTION

My invention provides an improved servo feed control circuit capable of controlling any electrically operated motive means for providing relative movement between workpiece and electrode. My circuit is equally useful in electrohydraulic systems as shown or in the direct control of electrical motors or the like. The circuit employs a differential amplifier with two transistors controlled in their conduction by a reference signal applied to the control electrode of one and by a control signal derived from the drive signal and gap applied to the control electrode of the other. The control signal is derived from a network connected between a drive signal source in the electronic power supply itself and the gap as will be explained hereinafter.

DESCIIPTION OF THE DRAWING

FIGS. 1 and 1a are schematic diagrams of the control circuit.

The electrical discharge machining power supply includes a main machining power source 10. The machining power pulses are passed to the gap between tool electrode 12 and workpiece 14 through periodic operation of output transistor 16 which has its power electrodes, i.e., collector and emitter in series between power source 10 and the gap. Fixed resistor 18 and rheostat 20 are series connected between the emitter of transistor 16 and the gap to provide for control of cutting current being passed to the gap. A pulser or multivibrator 22 is used to provide variable on-off time, variable frequency triggering pulses through one or more drive stages 24 to operate transistor 16. Several types of multivibrators suitable for use in this type of electrical discharge machining power supply are shown and described in Lobur U.S. Pat. No. 3,243,567 issued on Mar. 29, 1966 and entitled "Electrical Discharge Machining Apparatus." While my invention is shown in connection with a transistorized EDM power supply it is not so limited but may be employed in any supply where an electronic switch is connected between a DC power source and the machining gap and periodically triggered into operation. By "electronic switch" is meant any electronic control device having three or more electrodes comprising at least two power electrodes acting to control current flow in the power circuit, the conductivity of the power circuit being controlled by a control electrode within the switch whereby the conductivity of the power circuit is controlled statically or electrically without movement of any mechanical elements within the switch. Included within this definition are vacuum tubes, transistors and the like.

My servo control circuit has its reference voltage derived from a resistor network connected in shunt with DC source 10 which constitutes the main machining power supply. It includes fixed resistors 26, 28 connected in series with the variable resistor of potentiometer 30. Filter capacitor 32 is connected as shown. The control input for the differential amplifier is taken from the drive signal output from transistor 24 as shown. This signal is compared against an adjustable voltage set by potentiometer 30 to provide downfeed and back-up of the servo feed means. Drive signal charges capacitor 34 through resistor 36 and diode 38 which is poled as shown. Diode 38 is further shunted by resistor 40. The connection of the sensing network is completed to the gap through diode 42 whereby drive signal may be passed into the gap.

The direction of electrode movement is controlled by the direction of current flow through an electrically energized element, in this case an electro-magnetic servo valve coil 44 connected between the collectors of transistors 46 and 48. The full detail of the hydraulic motor and servo valve are not shown herein in the interest of simplifying this disclosure but a number of suitable electrohydraulic EDM servo control systems are shown in Webb U.S. Pat. No. 3,230,412 issued on Jan. 18, 1966, entitled "Servo Feed Apparatus for Electrical Discharge Machining." Diodes 50 are connected across the base-emitter junction of transistor 46 to protect it from excess turn-off voltage. Similarly, diodes 52 are connected across the base-emitter junction of transistor 48. Rheostat 54 has its variable resistor connected between the collector of transistor 48 and the parallel RC network including resistors 56, 58 and capacitor 60 to provide for adjustment for sensitivity of the servo operation. Potentiometer 54 may optionally be connected as shown in FIG. 1a and identified by the numeral 54a. The first shown position of potentiometer 54 is preferable when the power supply circuit is being operated at relatively high frequencies whereas the placement in shunt with coil 44 as shown by FIG. 1a is preferable during relatively low frequency operation. A pair of parallel RC networks are selectively connectible in series circuit with coil 44 through the operation of switch 62. The lower RC network comprising resistor 64 and capacitor 66 is in the circuit during normal operation. A second RC network of different time constant including the upper RC network with resistors 68, 70 and capacitor 72 is connectible in the circuit during high frequency finishing operation to slow down the servo system. Current limiting resistors 74 and 76 are connected in circuit with the respective bases of transistors 46, 48. Load resistors 78 and 80 are connected between the respective collectors of transistors 46 and 48 and the negative voltage terminal of DC source 10 while resistor 82 is coupled between the positive terminal of DC source 10 and the emitters of transistors 46, 48.

DESCRIPTION OF OPERATION

When the power supply and multivibrator are turned on, drive signals are passed from transistor 24 to control the operation of output transistor 16. Machining power pulses are provided across the gap with precisely controllable frequency and on-off time or duty factor. At the same time, the negative drive signal is passed through resistor 36 and diode 38 to store on the upper plate of capacitor 34. At the same time, a portion of this drive signal will be passing to the gap through diode 42. The negative drive signal stored on capacitor 34 provides turn-on of transistor 46. Electron flow then occurs from the negative terminal of DC source 10 through resistor 78, the collector-emitter of transistor 46 and resistor 82 to the positive terminal of DC source 10. At the same time, electron flow occurs through resistor 80, potentiometer 54, resistor 56, in a leftward or downfeed direction through coil 44, through resistor 64 and through transistor 46. The electron flow in a leftward direction through coil 44 causes the electrode 12 to be advanced downwardly toward the work 14. During a shorted gap, the other transistor 48 will be turned on providing inter alia an electron flow through coil 44 in a rightward or up-feed direction to withdraw the electrode 12 and move it upwardly away from the workpiece 14 to permit the short circuit condition to be cleared. It is also significant that during a short circuit condition the electrode is being withdrawn from the workpiece and at the same time, by reason of the sensing network used, namely that including resistor 36, diodes 42, 38 and capacitor 34, and its connection to the gap, the drive signal is being virtually all passed to plus gap terminal or ground. This provides both prompt and effective backup and gap current limiting at the same time.

A feature of additional importance is that of the incorporation of two RC networks in series with control coil 44. The networks referred to are those including resistor 64, capacitor 66 and resistors 56, 58, capacitor 60. During normal cutting, the hydraulic control coil 44 will pass current in one direction only and hold the gap constant according to the reference setting made on potentiometer 30. If the gap should short circuit, capacitors 66 and 60 will discharge rapidly and provide fast ram back-up for perhaps 0.01 to 0.10 inch. This assists greatly in cutting away particles which may have been accumulated in the gap, and in breaking up the short circuit condition. Capacitors 66 and 60 will then become charged to the opposite direction and provide a fast servo downfeed for about 0.01 to 0.10 inch immediately after the gap short circuit condition was relieved. This provides highly effective pulsing of the gap during up or down feed and particularly improves deep hole cutting by clearing the shorted gap more quickly and preventing the electrode from backing out all the way.

While the control signal for the differential amplifier was derived from a network connected between drive signal source and the gap, it would also be possible to connect the upper terminal of the sensing network to point B rather than to point A as indicated on the drawing. Otherwise stated, the sensing network used can derive a valid control signal from an electronic switch in the power supply circuit which is pulsed or operated in unison with the output switch or output switch bank.

It will thus be seen that I have provided a new and improved servo feed control circuit for electrical discharge machining.

I claim:

1. In an electrical discharge machining apparatus having a power supply and an electronic switch periodically operated by a drive signal source for providing machining power pulses across a dielectric coolant filled gap between an electrode and a workpiece, servo means for controlling the gap spacing including a reversible motive means, and an electrically energized element for controlling operation of said motive means, wherein the improvement comprises a sensing means operatively connected between said drive signal source and said gap for providing a first voltage signal representative of gap spacing, an adjustable reference voltage source for providing a second voltage signal, and means for providing a control signal to said element representative of the difference in magnitude between said first and second voltage signals.

2. The combination as set forth in claim 1 wherein said last mentioned means comprises a differential amplifier for comparing said first and second voltage signals for downfield and back-up of said motive means.

3. The combination as set forth in claim 2 wherein said differential amplifier comprises a pair of like polarity transistors, each of said transistors having a like power electrode coupled to a different terminal of said element to provide current flow therethrough in opposing directions and each of said transistors having its control electrode connected to one of said voltage signals.

4. The combination as set forth in claim 3 wherein a pair of parallel resistor-capacitor networks are included, one of said networks connected in series between said power electrode of one of said transistors and one terminal of said element and the other of said networks connected in series between said corresponding power electrode of the other of said transistors and the other terminal of said element for providing fast initial response to gap condition change.

5. In an electrical discharge machining apparatus having a drive signal source and a periodically operated electronic switch connected thereto for providing machining power pulses from a power supply across a dielectric coolant filled gap between an electrode and a workpiece, servo means for controlling the gap spacing and providing relative movement between said electrode and workpiece including a reversible and electrically operated motive means, wherein the improvement comprises a sensing means coupled between said drive signal source and said gap for providing a control voltage signal which is a function of gap spacing, a reference voltage signal source, and means responsive to the difference between said control voltage signal and said reference voltage signal for controlling the operation of said motive means.

6. In an electrical discharge machining apparatus having an electronic switch periodically operated by a drive signal source for providing machining power pulses across a dielectric coolant filled gap between an electrode and a workpiece, a servo feed means for providing relative movement between said electrode and workpiece including electrically controlled motive means, wherein the improvement comprises a means operatively connected to said drive signal source and to the gap for sensing the level of drive voltage being fed to the gap and means responsive to said level operatively connected between said sensing means and said motive means for maintaining a predetermined spacing between said electrode and workpiece.

References Cited

UNITED STATES PATENTS 3,292,040    12/1966    Ullmann et al.

RALPH F. STAUBLY, Primary Examiner